United States Patent [19]

Magazian et al.

[11] 4,358,167

[45] Nov. 9, 1982

[54] BEARING ELEMENT

[75] Inventors: Harry Magazian, Torrington; Alan L. Gabrielson; John H. Cowles, both of Bristol, all of Conn.

[73] Assignee: The Torrington Company, Torrington, Conn.

[21] Appl. No.: 266,710

[22] Filed: May 26, 1981

[51] Int. Cl.³ .............................................. F16C 33/20
[52] U.S. Cl. .................................... 308/78; 308/238; 308/240; 308/241; 308/DIG. 7
[58] Field of Search ................. 308/37, 238, 240, 241, 308/DIG. 7, 237 R, DIG. 8, DIG. 9, 78

[56] References Cited

U.S. PATENT DOCUMENTS

| 3,033,623 | 5/1962 | Thomson | 308/238 |
| 3,360,312 | 12/1967 | DeWit et al. | 308/241 |
| 4,026,657 | 5/1977 | Chmura | 308/241 |
| 4,074,512 | 2/1978 | Matt | 308/238 |

*Primary Examiner*—Lenard A. Footland
*Attorney, Agent, or Firm*—F. S. Troidl

[57] ABSTRACT

A rough and porous coating is applied by spraying and metallurgically bonding to a bearing member. The coating is preferably of a strong and thermally conductive material, such as aluminum-bronze, with the coating having interstices, such as cavities, undercuts and craters to provide a porous material. A lamina section of interwoven solid lubricant threads and bondable threads in an adhesive is applied to the coating.

8 Claims, 4 Drawing Figures

BEARING ELEMENT

This invention relates to bearings. More particularly, this invention is a new and novel bearing element having a low-friction slide surface.

The U.S. Pat. No. 4,123,122 patented Oct. 31, 1978 in the name of Gabrielson et al. and entitled "Bearing Element" discloses a bearing which has a high-strength, hardened bearing substrate with a low-friction layer mechanically held as well as chemically bonded to it in such a way as to provide high bearing load capacity with good resistance to the extruding of the low-friction lubricant layer out of the bearing under high bearing loads and with capacity for good heat transfer from the bearing slide surface. The solid lubricant eliminates the need for fluid or grease lubrication.

Some different types of self-lubricating bearings currently in use include low-friction liners which are separately attached to the substrate material. The liner may include a woven cloth having at least its slide surface formed predominantly of polytetrafluoroethylene. The cloth is embedded in a hard resin and bonded to the bearing substrate. However, usually additional mechanical means are required in the bearing for securing the fluorocarbon layer to the substrate. If the mechanical means for securing the fluorocarbon layer to the substrate is not used, but the liner is applied directly to the substrate, the liner is not always sufficiently firmly secured to the substrate. For example, U.S. Pat. No. 3,033,623 patented May 8, 1962 by J. B. Thompson and entitled "Fluorocarbon Sleeve Bearing" discloses the direct attachment of a resinous fluorocarbon layer to a substrate but also discloses in several other embodiments additional mechanical means for attaching the fluorocarbon layer to the substrate because, as stated in U.S. Pat. No. 3,033,623, direct attachment is not always sufficient to firmly secure the layer to the substrate.

We have unexpectedly discovered that a lamina section of interwoven solid lubricant threads and bondable threads in an adhesive, when applied to a porous coating previously applied to the substrate, results in a bearing which operates effectively under most conditions. Additional mechanical means are not needed. The craters, interstices and depressions in the porous coating causes the porous coating itself to provide additional mechanical securing of the lamina section to the substrate. A metallurgically spray-bonded coating is used which preferably will be made of a high strength, high thermal conductive metal, such as aluminum-bronze. The coating provides a multiplicity of random, closely-spaced craters or surface voids and subsurface undercuts and passageways. A lamina section of interwoven solid lubricant threads and bondable threads in an adhesive is applied to the coating. The surrounding multitudinous asperities of the metal deposit create a containing and reinforcing and strengthening mechanism which combines with chemical adhesion to inhibit the natural tendency of the adhesive film to flow under the pressure of high applied loads.

Where high strength is more important than heat transfer, as in a high load low speed bearing application, a porous steel coating, for example, may be used to hold the lamina section. Where extremely high ambient temperatures will be encountered, a porous ceramic coating, such as aluminum oxide, may be metallurgically spray-bonded to form the coating. Thus, our process can be tailored to suit the anticipated operating conditions of the bearing by spray-bonding different porous coatings onto the substrate to support the lamina section. If desirable for a particular application, we can spray-bond one porous coating over another, for example a layer of aluminum-bronze or phosphor-bronze over a layer of steel.

The aluminum-bronze is an alloy consisting of copper and aluminum with or without some additional material. A particularly good aluminum-bronze mixture for use with this invention would include 9.5 percent aluminum, 89.5 percent copper, and 1 percent iron.

Briefly described, this invention is a bearing element having a low-friction slide surface comprising a metallurgically spray-bonded porous and rough coating on a bearing substrate. The coating is formed by metallurgical spray-bonding metallic or ceramic material onto the substrate with the resulting particles bonding to the substrate and to each other. This coating has interstices, cavities, craters, voids and undercuts. A lamina section of interwoven solid lubricant threads and bondable threads in an adhesive is applied to the coating. The adhesive fills the craters, cavities, interstices, and undercuts in the coating.

Our new method of making a bearing element comprises the steps of metallurgically spray-bonding a material, such as for example aluminum-bronze, to a substrate such as a steel bearing member, so that the material particles metallurgically bond to the bearing substrate and to each other, and form a rough and porous coating. Our process allows us to use a previously fully-hardened bearing substrate, which many other processes do not allow. The lamina section of interwoven solid lubricant threads and bondable threads in an adhesive is then applied to the coating layer. The material is then cured under heat or under heat and pressure for the required time and at the required temperature.

The invention, as well as its many advantages, may be further understood by reference to the following detailed description, and drawings in which.

In the various figures, like parts are referred to by like numbers.

Figure 1:
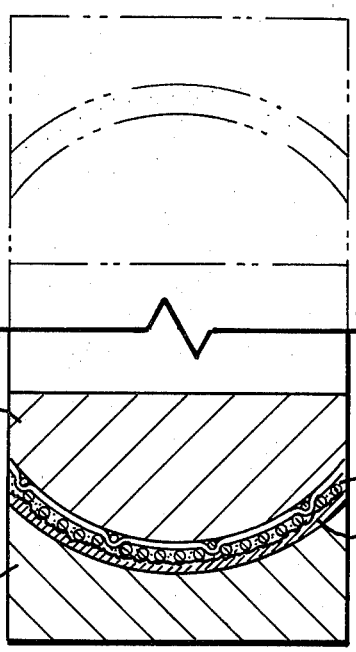
FIG. 1 is a sectional view of a spherical or self-aligning type bearing embodying the invention.

Referring to the figures, and more particularly to FIG. 1, the bearing shown comprises a truncated bored metal ball member 10 and an outer annular metal race 12. The inside surface of the annular metal race 12 has the metallurgically spray-bonded coating 14 which may consist entirely or substantially of an aluminum-bronze metal. The lamina section is identified by the number 16.

In FIG. 1, the coating layer 14 and the lamina layer 16 are shown somewhat exaggerated for clarity. The large heat transfer surface area of the coating asperities assist greatly in transferring heat away from the lamina layer, as compared to heat transfer from the lubricant adhesive layer to a comparatively smooth substrate with its relatively smaller heat transfer surface area.

Figure 2:
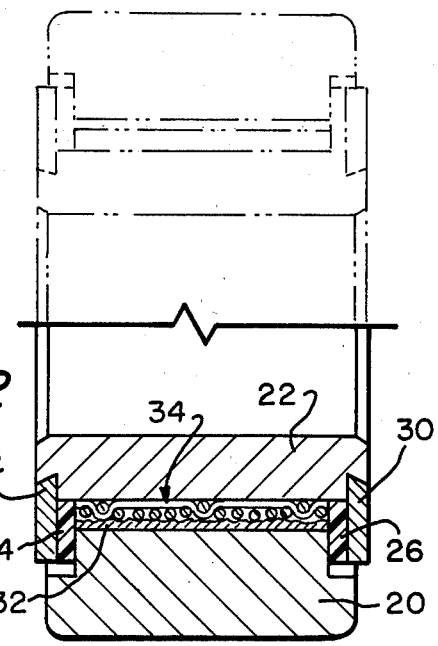
FIG. 2 is a sectional view of a track roller.

FIG. 2 shows a track roller having an outer race 20, an inner race 22, and annular seals 24 and 26 kept in place by annular members 28 and 30, respectively. The inside surface of outer race 20 has the metallurgically spray-bonded coating 32. The lamina section is identified by the number 34. The coating layer 32 and lamina section 34 are exaggerated for clarity. The specific constituents of coating layer 32 and lamina section 34 will be described by reference to FIG. 3 and FIG. 4, it being understood the specific constituents of coating layer 14 and lamina section 16 of FIG. 1 may be the same as coating layer 32 and lamina section 34, respectively, of FIG. 2.

Figure 3:
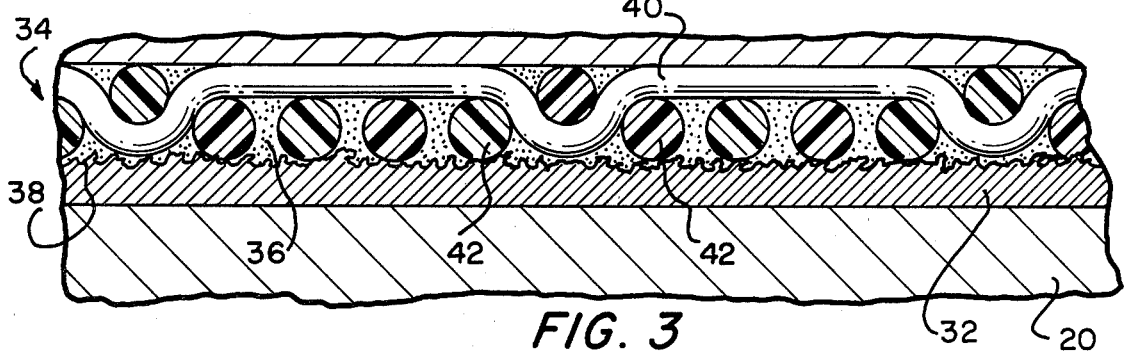
FIG. 3 is an enlarged, fragmentary view of a portion of FIG. 2.
Figure 4:
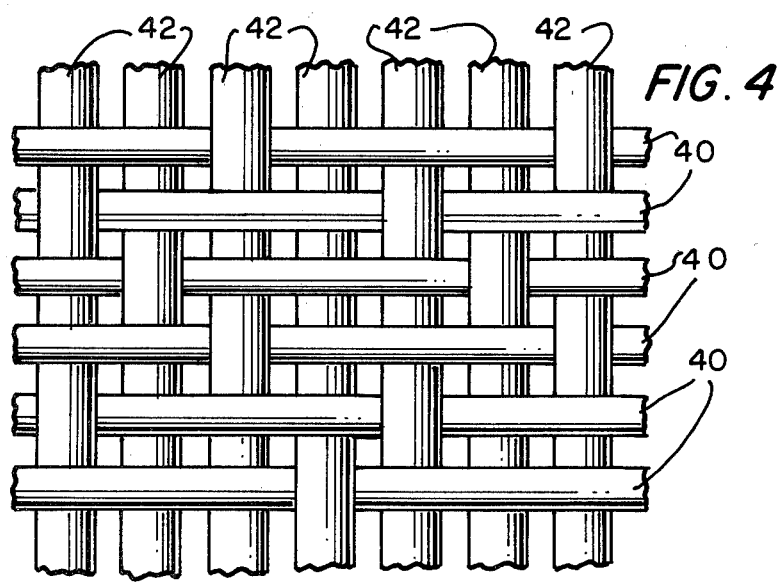
FIG. 4 is a plan view of the lamina section of interwoven solid lubricant threads and bondable threads.

FIG. 3 is a sketch illustrating a portion of the bearing of FIG. 2 magnified many times. FIG. 3 shows the cavities, undercuts, and craters appearing in the coating material after the metallurgical material 32 has been applied to the metal outer race 20. The coating material is applied to the substrate or outer race 20 by metallurgical spray-bonding. Our preferred method of applying the coating material to the substrate surface is to plasma spray the material onto the substrate surface. A flame spray (sometimes called spray weld) D-gun and Gator gun are three variations of the process that can be utilized to deposit the metallurgical coating material. The terms flame gun and spray weld have been used on variations of the process. The coating and the lamina may be applied to cylindrical, spherical, flat plane, or any surface where sliding loads are transmitted through a conforming surface. The substrate or outer race 20 may be any material so long as the coating material metallurgically adheres to it, and the substrate does not harmfully, plastically deform under the loads imposed by the specific bearing application. Our preferred substrate material is hardened steel. Porous substrates may be sprayed as well as solid substrates.

The highly-enlarged view illustrates the interlocking arrangement of the coating 20 and the adhesive 36 after curing. Notice that there are many cavities, depressions, and undercuts 38. The preferred adhesive is a phenolic, modified phenolic adhesive or a vinyl phenolic; and the preferred solid lubricant thread 40 is made of polytetrafluoroethylene known as Teflon (Du Pont). Threads 40 are interwoven with bondable threads 42 and are embedded in the phenolic adhesive 36. Notice that the adhesive 36 fills the craters and undercuts of the coating material.

For certain uses of the bearing, a polyamide-imide resin may be substituted for the phenolic adhesive. Another suitable adhesive may consist of an epoxy resin. a polyimide or a polyamide-imide may also be used.

In applying the lamina section 34 to the porous coating 32, the interwoven solid lubricant threads 40 and bondable threads 42 have an adhesive such as a phenolic, polyimide, or epoxy applied to one surface of the fabric, and the fabric is calendered under heat and pressure. A second coat of the thermo-setting resin may be applied to the previously-coated side and dried at room temperature. A strip of the fabric is cut of sufficient size to cover the surface of the substrate. The coated side of the lamina section is then applied to porous coating 32 of the bearing. The assembled bearing is then subjected to elevated temperature and pressure to force the adhesive into the interstices of the aluminum-bronze coating and to thermo-set the room-dried adhesive.

Suitable bondable threads may consist of materials such as cotton, dacron, nylon, vinyl, wool, glass, and the like.

We Claim:

1. A bearing element consisting of a bearing substrate having a low-friction slide surface layer, said layer comprising: a porous coating metallurgically spray-bonded to the substrate surface and having interstices such as craters and undercuts and a lamina section of interwoven solid lubricant threads and bondable threads in an adhesive applied to the coating.

2. A bearing element in accordance with claim 1 wherein: the solid lubricant threads are fluorocarbon threads.

3. A bearing element in accordance with claim 1 wherein: the adhesive is a thermo-setting phenolic resin.

4. A bearing element in accordance with claim 1 wherein: the metallurgically spray-bonded coating is a metal.

5. A bearing element in accordance with claim 1 wherein: the metallurgically spray-bonded coating is a ceramic.

6. A bearing element in accordance with claim 1 wherein: the metallurgically spray-bonded coating is aluminum-bronze.

7. A bearing comprising two bearing elements having surfaces in mating slidable engagement with each other, the surface of at least one of said elements comprising: a rough and porous coating metallurgically spray-bonded on said surface and having interstices; and a lamina section of interwoven fluorocarbon threads and bondable threads in an adhesive applied to the coating.

8. A bearing in accordance with claim 7 wherein: the porous coating is aluminum-bronze and the fluorocarbon threads are polytetrafluoroethylene threads.

* * * * *